(12) United States Patent
Spetler (10) Patent No.: US 7,827,858 B2
(45) Date of Patent: Nov. 9, 2010

(54) SYSTEM FOR ESTIMATING THE MAXIMUM ADHERENCE COEFFICIENT BY MEASURING STRESSES IN A TIRE TREAD

(75) Inventor: Frédéric Spetler, Lezoux (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 907 days.

(21) Appl. No.: 11/631,267

(22) PCT Filed: Jun. 27, 2005

(86) PCT No.: PCT/EP2005/052987

§ 371 (c)(1),
(2), (4) Date: Dec. 28, 2006

(87) PCT Pub. No.: WO2006/010680

PCT Pub. Date: Feb. 2, 2006

(65) Prior Publication Data

US 2008/0294352 A1 Nov. 27, 2008

(30) Foreign Application Priority Data

Jun. 30, 2004 (FR) .................................. 04 07286

(51) Int. Cl.
*G01M 17/02* (2006.01)
(52) U.S. Cl. ...................................................... 73/146
(58) Field of Classification Search ............ None
See application file for complete search history.

(56) References Cited

U.S. PATENT DOCUMENTS

| 5,864,056 | A | 1/1999 | Bell et al. | |
| 6,666,079 | B2 | 12/2003 | Poulbot et al. | |
| 6,888,471 | B2 * | 5/2005 | Elsner et al. | 340/686.3 |
| 6,931,912 | B2 * | 8/2005 | Tsuchie et al. | 73/9 |
| 7,069,135 | B2 * | 6/2006 | Bertrand | 701/80 |
| 7,099,765 | B2 * | 8/2006 | Bertrand | 701/73 |
| 2002/0166373 | A1 | 11/2002 | Mancuso et al. | |

FOREIGN PATENT DOCUMENTS

| EP | 0 937 615 | 8/1999 |
| EP | 0 937 615 A | 8/1999 |
| FR | 2 835 919 | 8/2003 |

(Continued)

*Primary Examiner*—Lisa M Caputo
*Assistant Examiner*—Jermaine Jenkins
(74) *Attorney, Agent, or Firm*—Cohen Pontani Lieberman & Pavane LLP (57) ABSTRACT

A system for estimating the maximal grip coefficient μ in the contact area of a tire on a road. A tire tread is fitted with at least one tread sensor for measuring at least the tangential stresses which the tread experiences locally when the tire rolls on the ground. A signal processing unit and means for transmitting to the processing unit at least one signal delivered by the tread sensor are provided. The processing unit comprises means for finding in the signal the values corresponding to the sensor passing through the contact area of the tire on the ground, means for calculating an instantaneous value of a preselected criterion as a function of a series of values chosen from those relating to the sensor passing through the contact area, and means for extracting an estimate of the maximal grip coefficient μ by using the said instantaneous value.

17 Claims, 12 Drawing Sheets

| | FOREIGN PATENT DOCUMENTS | | |
|---|---|---|---|
| FR | 2 835 919 A | 8/2003 |
| FR | 2 841 336 | 12/2003 |
| FR | 2 841 336 A | 12/2003 |
| WO | WO 02/32733 | 4/2002 |
| WO | WO 02/32733 A | 4/2002 |

* cited by examiner

SYSTEM FOR ESTIMATING THE MAXIMUM ADHERENCE COEFFICIENT BY MEASURING STRESSES IN A TIRE TREAD

RELATED APPLICATION

This is a U.S. National Phase Application under 35 USC 371 of International Application PCT/EP2005/052987, filed on Jun. 27, 2005.

FIELD OF THE INVENTION

The present invention relates to the evaluation of the grip of a vehicle on a road. It relates more particularly to the determination of maximal grip characteristics between the road and a vehicle wheel fitted with an elastic tire, such as an inflated tire or a non-pneumatic elastic tire, which rolls on the road.

The present invention also relates to the various electronic assistance devices used, for example, for antilock control of the brakes of a vehicle or antiskid control of the drive wheels, control of the direction of a vehicle or alternatively for other forms of control or monitoring, for instance the tire pressures. It is known that such devices reconstruct the grip coefficient ($\mu$) of the tires on the road by calculation, without having carried out any measurement either of the grip coefficient or of the forces developed in the contact of the tires with the ground. Even though these devices provide significant assistance and extra safety, their operation would benefit greatly from the use of a measured value, or a value estimated on the basis of real measurements carried out on the tire during operation, principally a value representative of the maximal grip coefficient available in real time.

BACKGROUND OF INVENTION

Patent Application FR2835919 proposes to obtain an estimate of the maximal grip coefficient on the basis of measurements in the sidewall. This approach is therefore indirect, since the grip phenomenon takes place in the contact imprint on the ground. Patent Application WO 02/32733 A1 proposes to calculate micro-slips of the tire in the contact area on the basis of the speed. This approach is even more indirect since it no longer operates in the tire per se, and it is not possible to see what gain in precision could thus be obtained relative to the means in current use. U.S. Pat. No. 5,864,056 proposes to carry out measurements in an element of the tread by means of strain gauges, but does not explain how to process the signals recorded in this way. Patent Application EP 0937615 A2 proposes to carry out deformation measurements in elements of the tread, and illustrates the shape of the curves obtained in the case of dry ground and wet ground. According to this document, the slope reduction of the S-shaped signal measured in the element of the tread, particularly the appearance of a horizontal plateau, should be linked with a decrease of the grip. This, however, is visible only when the grip is already very small or even zero, and cannot therefore provide a sufficiently preventive alarm warning.

SUMMARY OF INVENTION

One object of the present invention is to provide a way of evaluating the maximal available grip of a vehicle which runs on a road, and more precisely of its wheels or tires or non-pneumatic elastic tires, these terms being regarded as equivalent in the context of the present invention.

The various electronic assistance devices mentioned above would therefore usefully benefit from "real-time" indications of the grip conditions liable to affect the performance of a vehicle, especially when it undergoes acceleration due to a driving force or a braking force, or due to a change of driving direction. The invention aims to provide a method of achieving this efficiently.

With a view to carrying out the measurements necessary for estimating the maximal grip coefficient, it has already been proposed that the tread of a tire, or certain specially adapted elements of the tread, be fitted with sensors intended to measure or estimate the forces generated locally, in particular under slip conditions. The reader may thus refer to U.S. Pat. No. 6,666,079. It is furthermore necessary to be able to extract the information relevant for estimating the maximal grip coefficient from the signals delivered by such sensors. This is an object of the present invention.

An embodiment of the invention estimates the maximal grip coefficient $\mu$ of a tire on the basis of the stresses measured in the tread pattern, for example in a tread block located substantially at the centre of the tread, or on the basis of another measurement reflecting the stresses i.e. one which can be correlated with the stresses, such as the deformation, which should be regarded as identical in the context of the invention.

The above-mention objects and other objects are attained in accordance with one aspect of the invention directed to a system for estimating the maximal grip coefficient $\mu$ in the contact area of a tire on a road, comprising a tire whose tread is fitted with at least one tread sensor for measuring at least the tangential stresses which the tread experiences locally when the tire rolls on the ground, comprising a signal processing unit and means for transmitting to the processing unit at least one signal delivered by the said tread sensor, wherein the processing unit comprises means for finding in the signal the values corresponding to the sensor passing through the contact area of the tire on the ground, means for calculating an instantaneous value of a preselected criterion as a function of a series of values chosen from those relating to the sensor passing through the contact area and means for extracting an estimate of the maximal grip coefficient $\mu$ by using the said instantaneous value.

One embodiment of the invention provides the means for recovering the <<maximal grip coefficient $\mu$>> information on the basis of acquiring measurements taken during the passage of a fixed point of the tread through the contact area on the ground. To this end, this acquisition of measurements is used for calculating a value conventionally referred to as the <<instantaneous value>> since it does not correspond to a particular point or a given time but to a calculation reflecting the situation prevailing in all or part of the contact area. This calculation resorts to a mathematical function referred to as a <<Criterion>>. A plurality of <Criteria>> may be employed. One or more of them are preselected once and for all as a function of a particular application envisaged (for example a particular tire on a particular vehicle). The said instantaneous value or values are then inserted into a mathematical function (which may itself reflect the preselected Criterion or Criteria, or may be an appropriate correlation) in order to obtain an estimate of the maximal grip coefficient $\mu$.

DETAILED DESCRIPTION OF THE DRAWINGS

Figure 1:
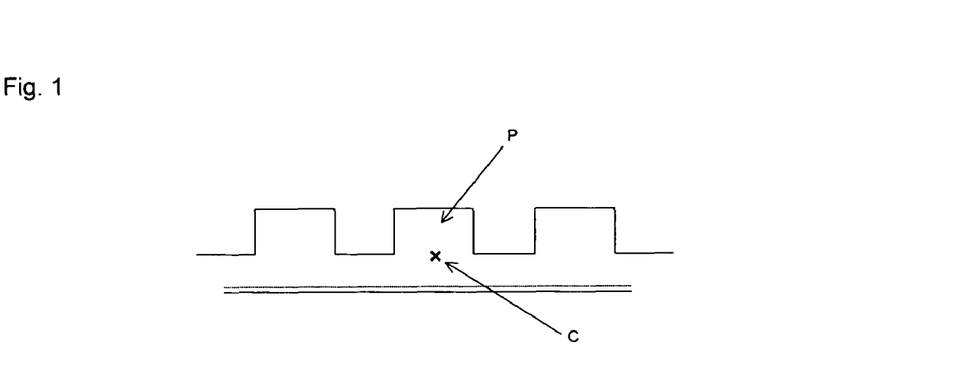
FIG. 1 illustrates the installation of a sensor in the tread of a tire.
Figure 2:
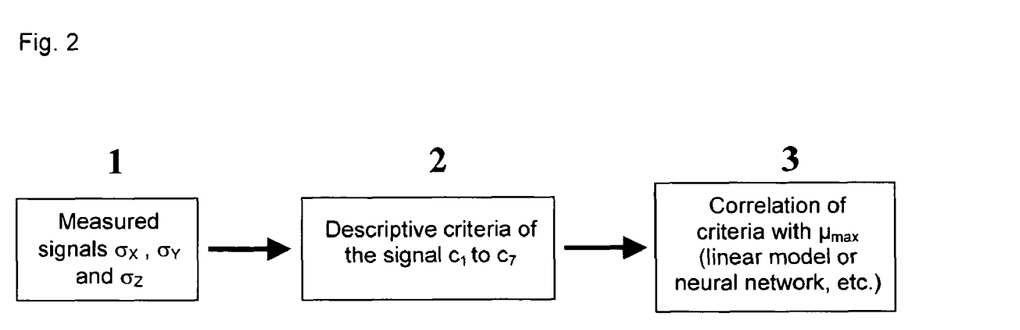
FIG. 2 is a block diagram illustrating the signal processing used by one embodiment of the invention.

FIG. 1 schematises a tread (of a tire, of a non-pneumatic elastic tire, of a caterpillar track, etc.) having a block 1 fitted with a sensor 10 installed at the base of the block 1, and the reinforcing plies 2 above. For further details concerning the sensor used in the system illustrating the present invention, the reader is invited to refer to the U.S. Pat. No. 6,666,079 cited above, the description of which is incorporated here by reference. The diagram of FIG. 2 shows the system according to the invention, of which the block <<1>> uses an aforementioned sensor in order to obtain signals containing the stress measurements $\sigma_x$ (shear in the longitudinal direction), the stress measurements $\sigma_y$ (shear in the transverse direction) and the stress measurements $\sigma_z$ (compression in the direction normal to the surface of the ground). A second block <<2>> performs various signal processing operations which will be explained in detail below, on the basis of signals delivered by the <<measurement>> block and optionally on the basis of other signals S1, S2, S3 . . . Sn giving information about the load of the tire, its inflation pressure, the driving or braking torque transmitted by the tire, the drift angle or the lateral force Fy, and the speed of rotation, which resort to the <<Criteria>> and the details of which will be given below.

The block <<2>> is a signal processing unit which may be installed in the vehicle, for example, whereas the sensor 10 and optionally other sensors used for one or other of the signals S1 to Sn are installed in the tire. The system according to the invention therefore comprises means for communication between the tire and the vehicle, the various possible forms of which are known to the person skilled in the art. By way of illustration, it will merely be indicated that Patent Application EP 1350640 illustrates an important element of these communication means, namely an antenna to be installed in a tire.

Lastly, the block <3>> makes it possible to determine an estimate of the maximal grip coefficient$\mu$ on the basis of one or several instantaneous values. The system according to the invention comprises a stage (block 3) for making a correlation between the value or values of one or more criteria and the value of the maximal grip coefficient $\mu$, by virtue of stored curves established experimentally or by virtue of mathematical models (for example: linear, polynomial model or neural network) whose coefficients have been fitted experimentally.

Figure 3:
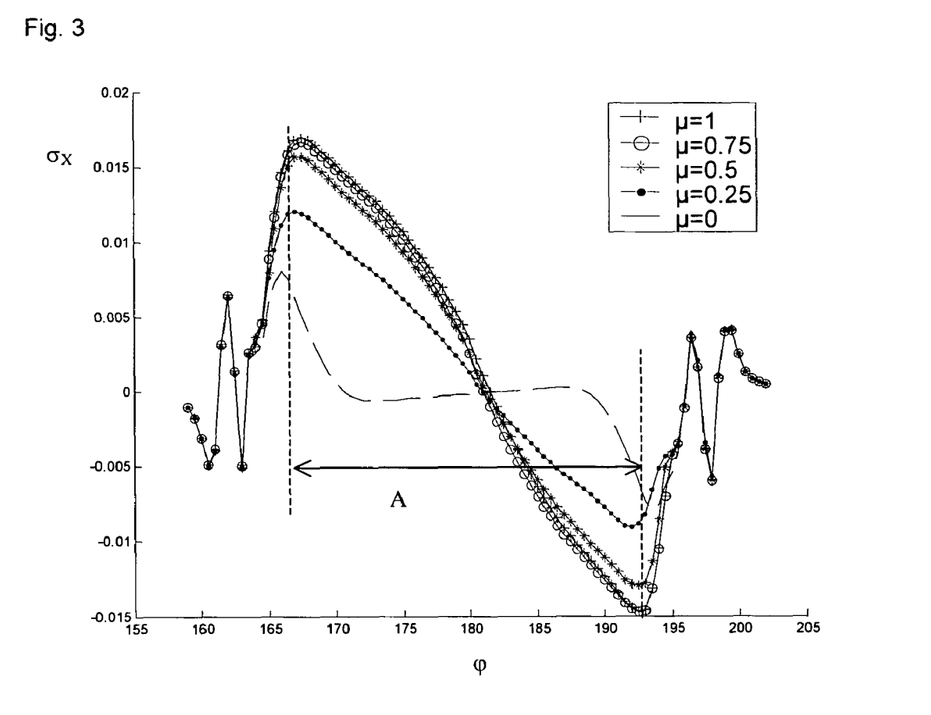
FIG. 3 gives the simulation results of a shear stress $\sigma(x)$ in the longitudinal direction.

Returning now to the tangential stress measurements, and in particular the longitudinal i.e. circumferentially oriented stress measurements. FIG. 3 illustrates simulation results of the shear stress $\sigma(x)$ in the longitudinal direction as a function of the angular position of the sensor in a conventional reference frame, according to which the sensor is at 0° when it lies directly opposite the contact area and crosses the vertical raised perpendicularly to the ground, which passes through the rotation axis of the tire. Simulation tools employing finite element calculations are used, a field which is well known to the person skilled in the art.

The results are those obtained for the same tire, identical to a Michelin® Energy XH1 195-65 R 15 tire except for its tread which is adapted to receive a force sensor below a tread pattern element of square general shape (see FIG. 1), under the same rolling conditions (more precisely here at 60 km/h, subjected to a load of 430 daN in free rolling, i.e. without a driving or braking torque or camber or drift) and for different grip levels. It is seen that the sensor enters the contact area on the ground when it reaches approximately the azimuth 165°, and leaves it approximately at the azimuth 195°. The reference <<A>> indicates that the choice has been made to employ the measurements acquired between the azimuths 162° and 192°, as will be explained below. On a central (along y) tread block of the contact area, FIG. 3 gives the shape of the X stresses corresponding to the measurement point, according to the $\mu$ whose values are indicated in FIG. 3, where $\Phi$ is the azimuth in degrees (180° is the longitudinal centre of the contact area on the ground—also referred to as the imprint), $\sigma_x$ is the X stress in daN/mm$^2$ and $\mu$ is the grip level.

Figure 3A:
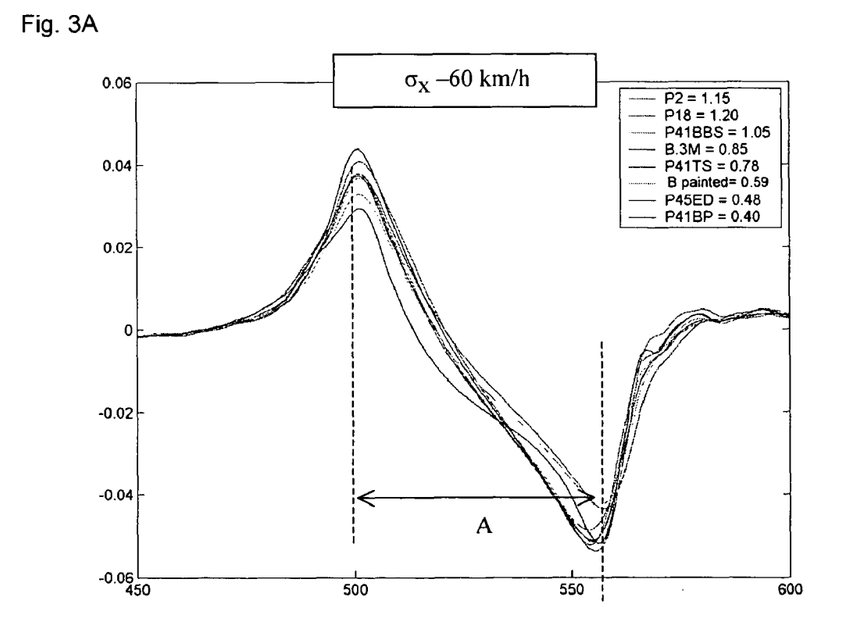
FIG. 3A gives the measurement recordings of a shear stress $\sigma(x)$ in the longitudinal direction.

FIG. 3A illustrates the measurement recordings of shear stress $\sigma(x)$ which are established under the same conditions except for the grip coefficient which, for the real tracks used, varies from 0.40 to 1.20 as indicated in the box shown in the upper right-hand corner of the figure. The numbers on the abscissa axis can be translated directly into azimuth, to within a multiplicative coefficient. It is seen that the various curves, which correspond to different ground surfaces, have a shape very similar to those obtained by simulation.

Figure 4A:
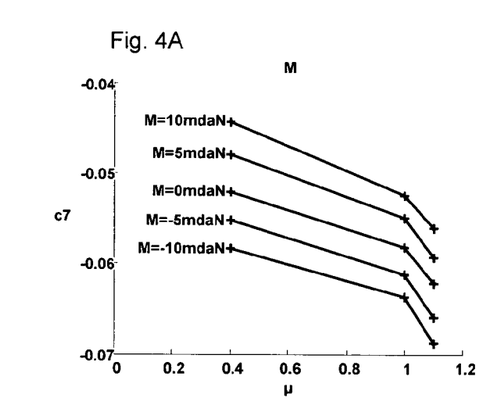
FIGS. 4A to 4F illustrate the influence of various parameters for a particular criterion.
Figure 4B:
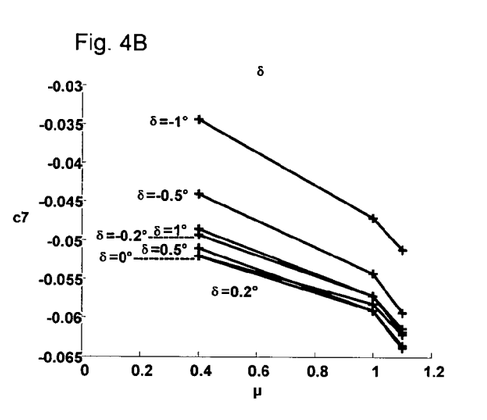
Figure 4C:
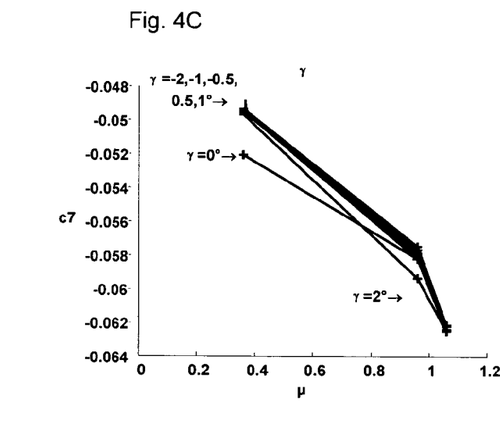
Figure 4D:
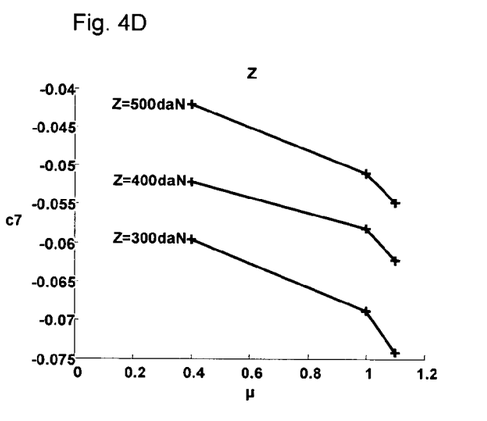
Figure 4E:
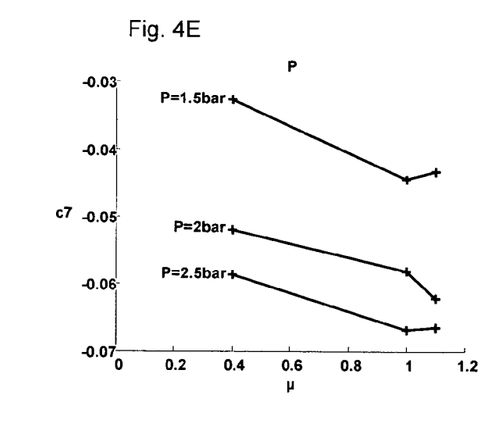
Figure 4F:
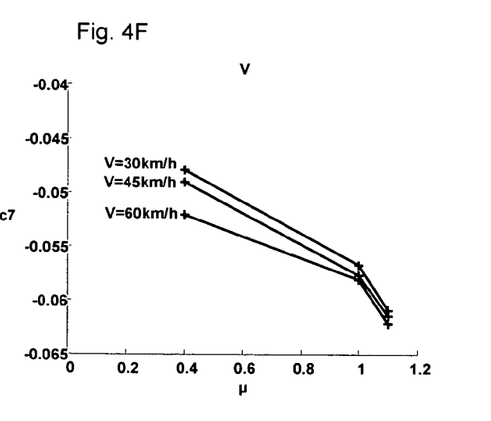
Figure 5A:
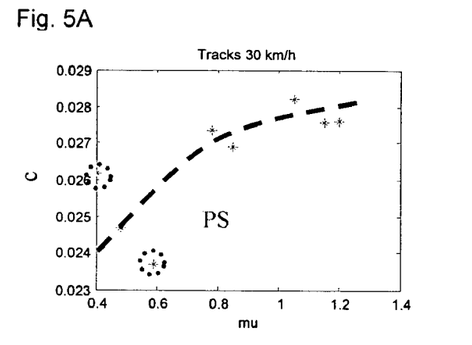
FIGS. 5A to 5D illustrate the correlation between the value of a first criterion called <<standard deviation of $\sigma(x)$>> and the value of the maximal grip coefficient $\mu$.
Figure 5B:
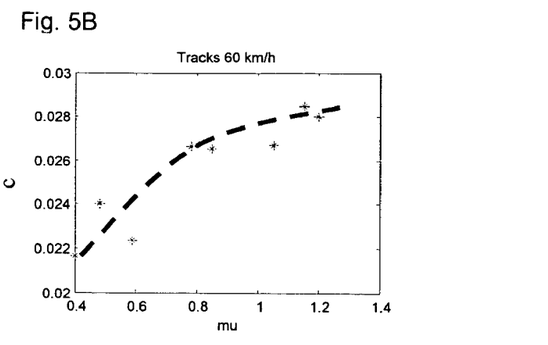
Figure 5C:
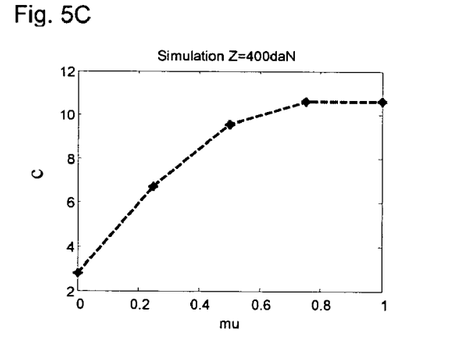
Figure 5D:
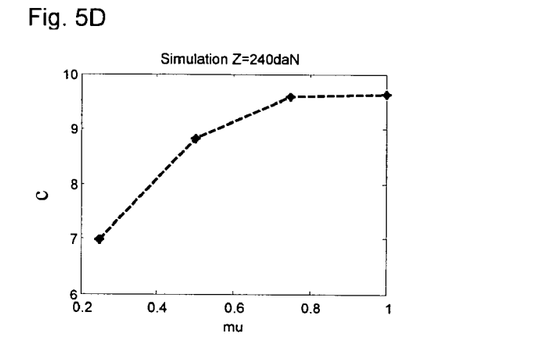
Figure 6A:
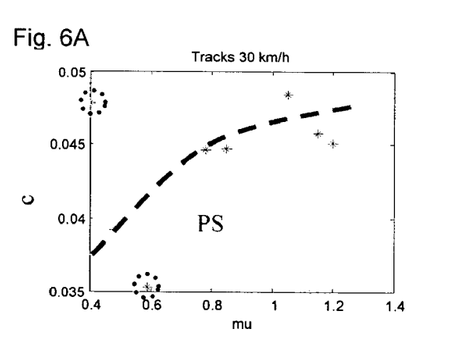
FIGS. 6A to 6D illustrate the correlation between the value of a first criterion called <<energy of $\sigma(x)$>> and the value of the maximal grip coefficient $\mu$.
Figure 6B:
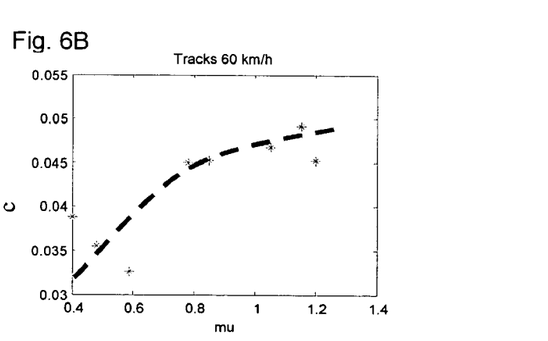
Figure 6C:
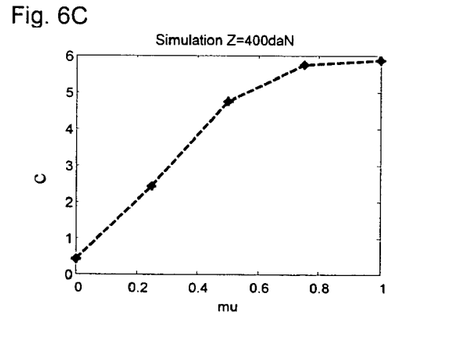
Figure 6D:
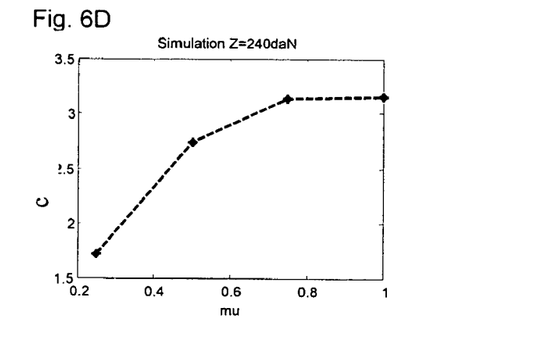
Figure 7A:
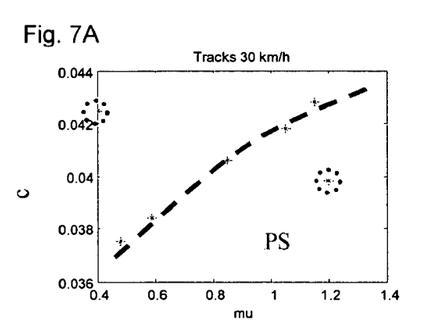
FIGS. 7A to 7D illustrate the correlation between the value of a second criterion called <<max value of $\sigma(x)$>> and the value of the maximal grip coefficient $\mu$.
Figure 7B:
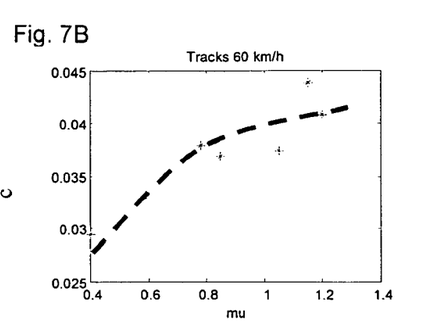
Figure 7C:
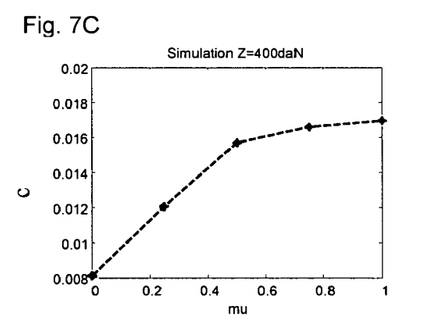
Figure 7D:
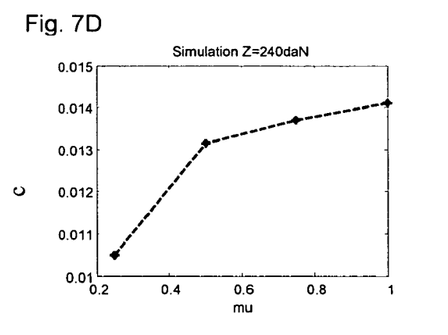
Figure 8A:
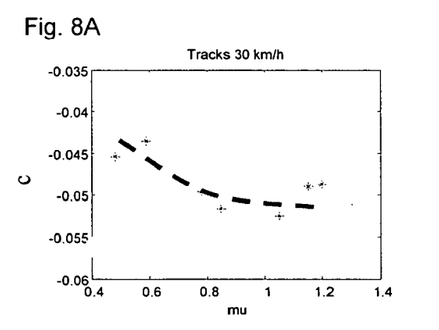
FIGS. 8A to 8D illustrate the correlation between the value of a third criterion called <<min value of $\sigma(x)$>> and the value of the maximal grip coefficient $\mu$.
Figure 8B:
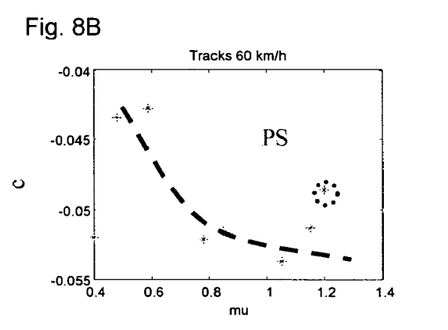
Figure 8C:
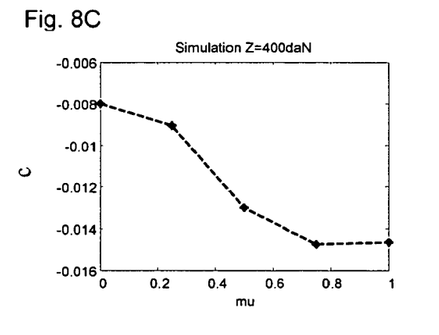
Figure 8D:
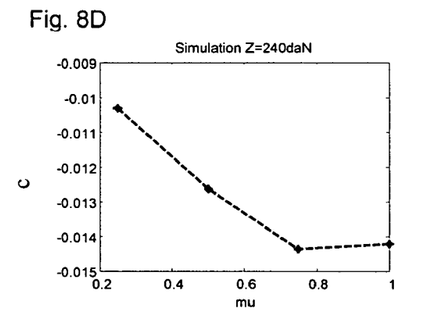
Figure 9A:
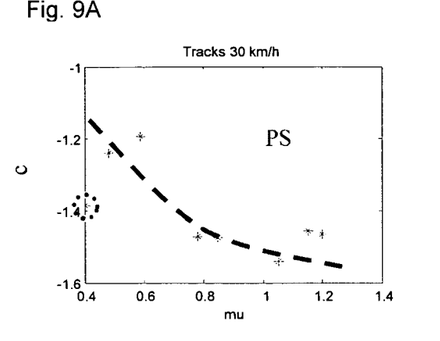
FIGS. 9A to 9D illustrate the correlation between the value of a fourth criterion called <<$1^{st}$ order polynomial of $\sigma(x)$>> and the value of the maximal grip coefficient $\mu$.
Figure 9B:
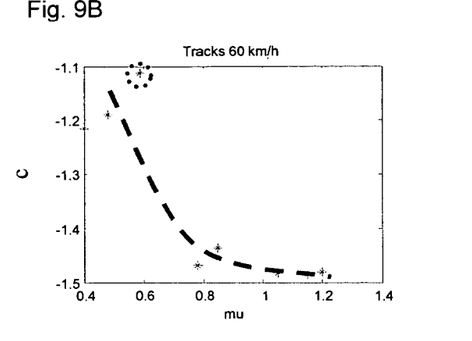
Figure 9C:
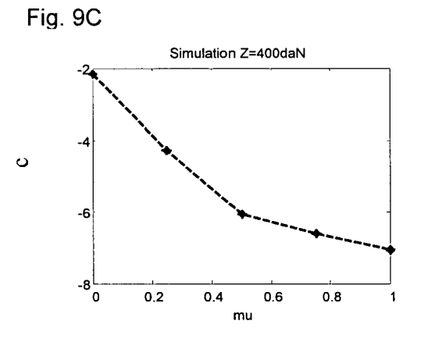
Figure 9D:
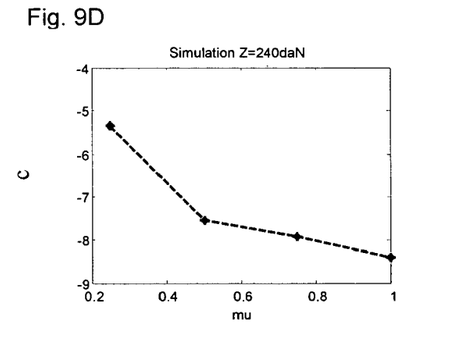
Figure 10A:
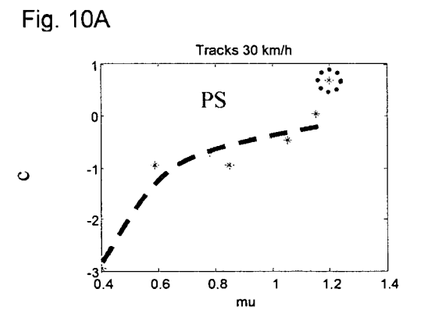
FIGS. 10A to 10D illustrate the correlation between the value of a fifth criterion called <<$2^{nd}$ order polynomial of $\sigma(x)$>> and the value of the maximal grip coefficient $\mu$.
Figure 10B:
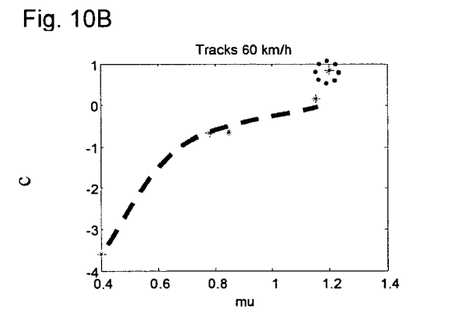
Figure 10C:
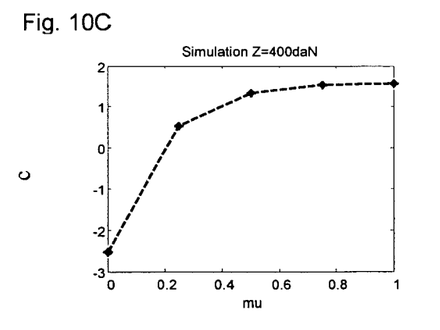
Figure 10D:
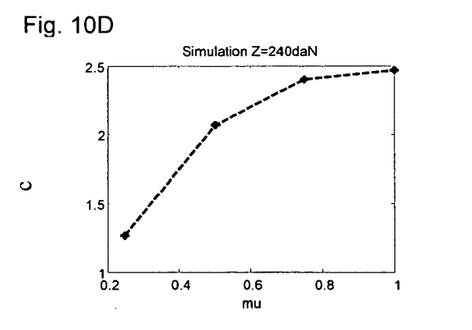
Figure 11A:
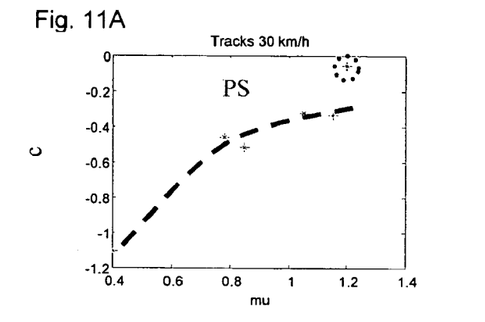
FIGS. 11A to 11D illustrate the correlation between the value of a sixth criterion called <<$3^{rd}$ order polynomial of $\sigma(x)$>> and the value of the maximal grip coefficient $\mu$.
Figure 11B:
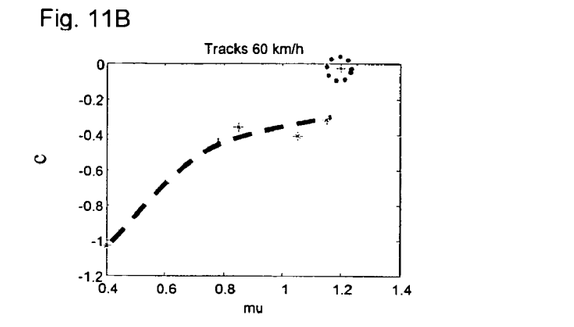
Figure 11C:
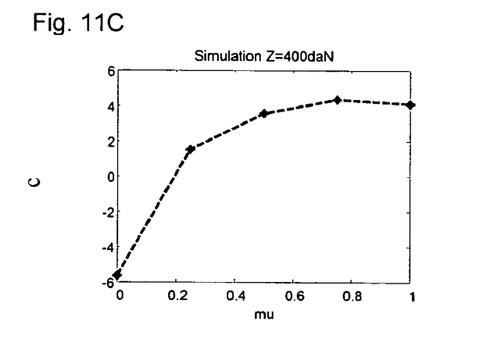
Figure 11D:
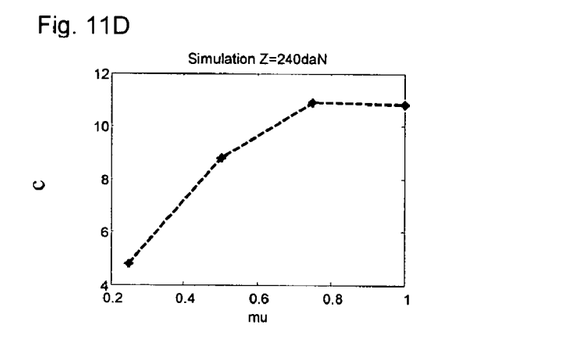
Figure 12A:
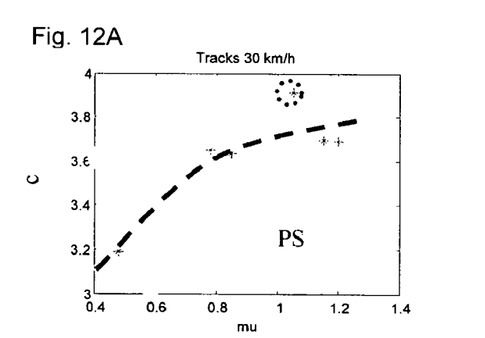
FIGS. 12A to 12D illustrate the correlation between the value of a seventh criterion called <<amplitude of the first harmonic of $\sigma(x)$>> and the value of the maximal grip coefficient $\mu$.
Figure 12B:
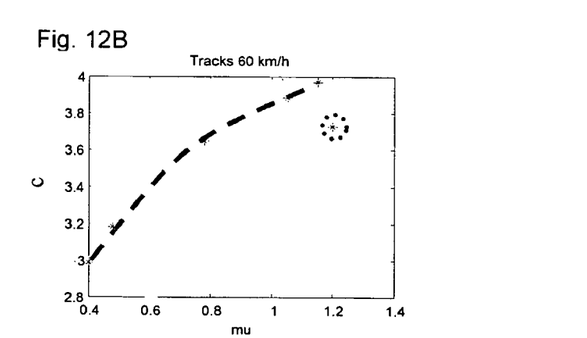
Figure 12C:
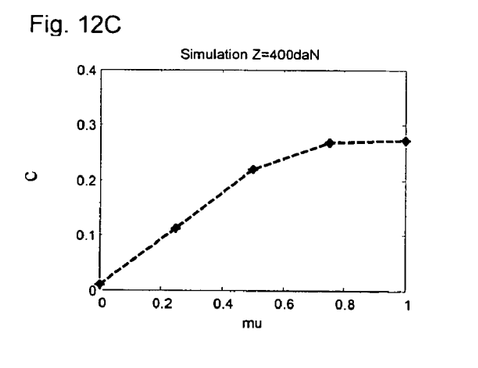
Figure 12D:
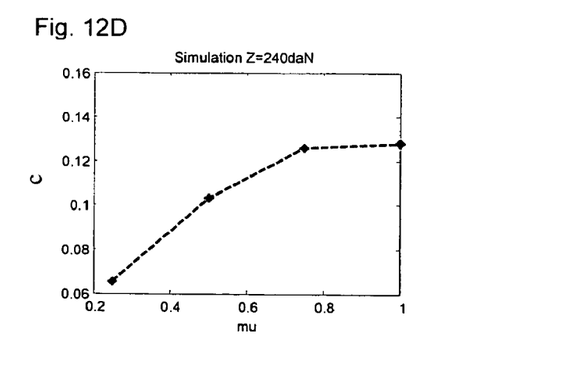
Figure 13A:
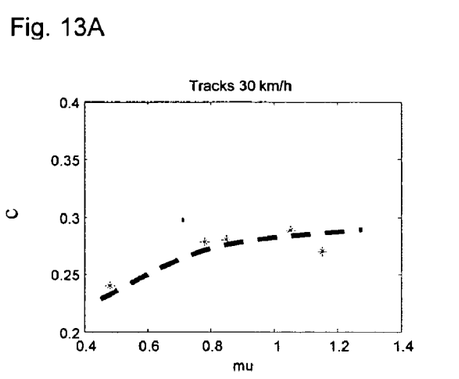
FIGS. 13A to 13D illustrate the correlation between the value of an eighth criterion called <<amplitude of the second harmonic of $\sigma(x)$>> and the value of the maximal grip coefficient $\mu$.
Figure 13B:
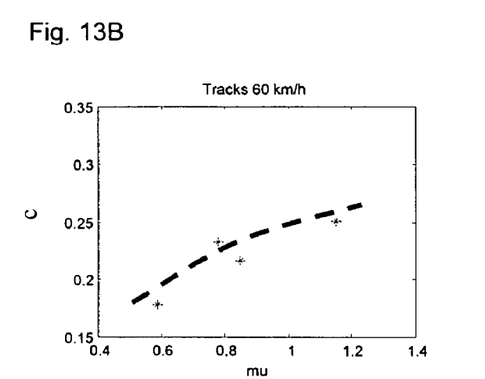
Figure 13C:
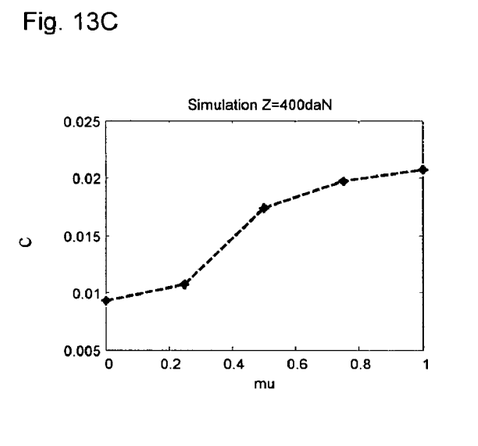
Figure 13D:
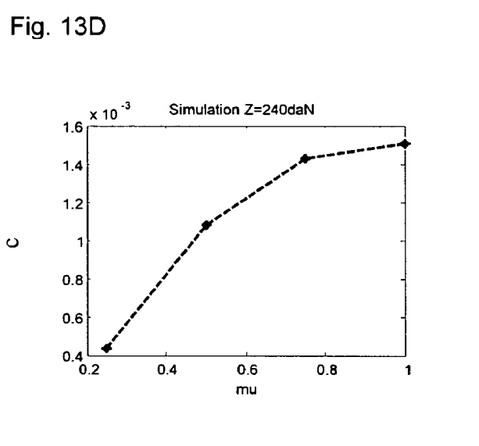
Figure 14A:
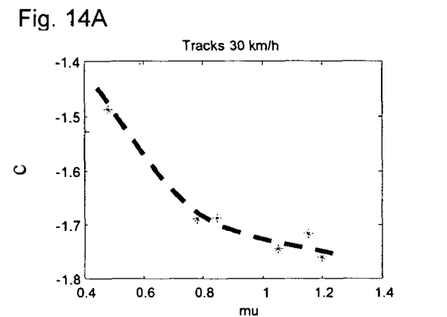
FIGS. 14A to 14D illustrate the correlation between the value of a ninth criterion called <<mean value of the derivative of $\sigma(x)$>> and the value of the maximal grip coefficient $\mu$.
Figure 14B:
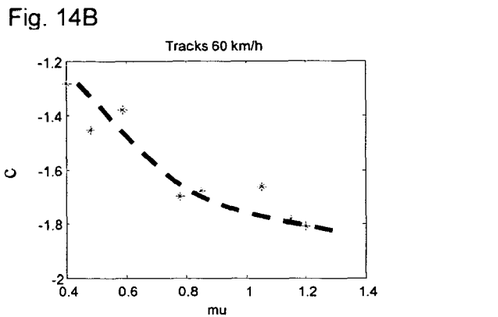
Figure 14C:
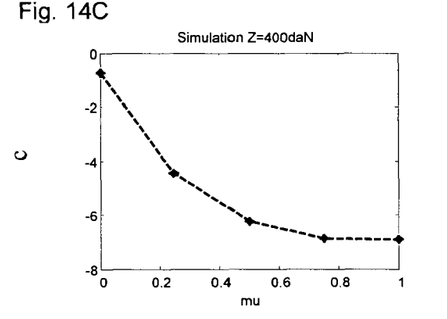
Figure 14D:
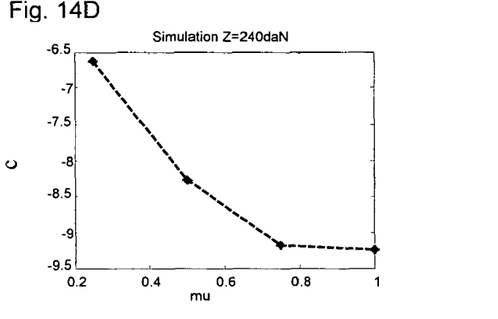
Figure 15A:
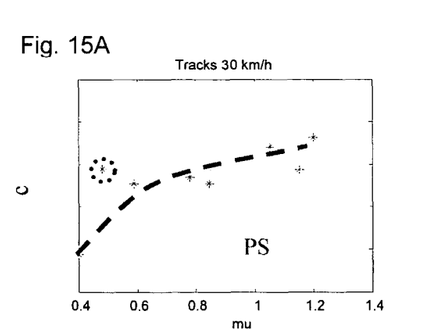
FIGS. 15A to 15D illustrate the correlation between the value of a tenth criterion called <<standard deviation of the derivative of $\sigma(x)$>> and the value of the maximal grip coefficient $\mu$.
Figure 15B:
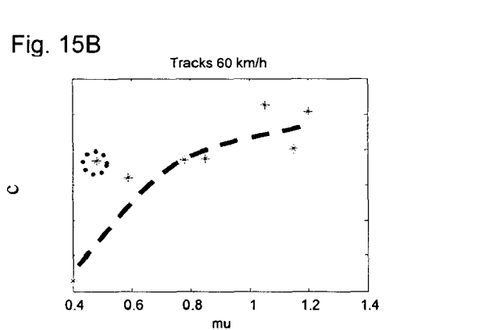
Figure 15C:
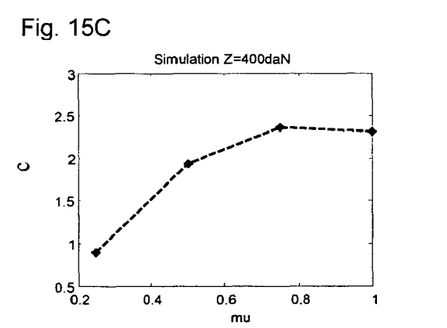
Figure 15D:
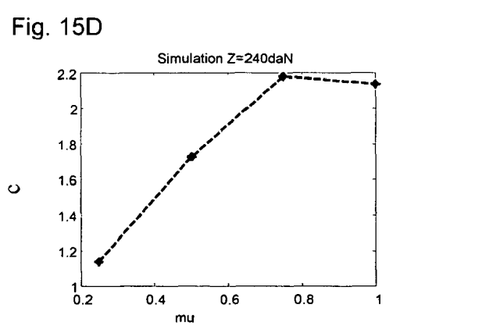
Figure 16A:
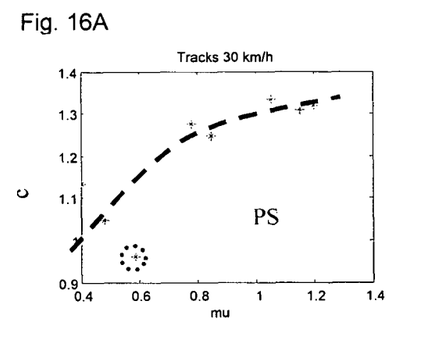
FIGS. 16A to 16D illustrate the correlation between the value of an eleventh criterion called <<energy of the derivative of $\sigma(x)$>> and the value of the maximal grip coefficient $\mu$.
Figure 16B:
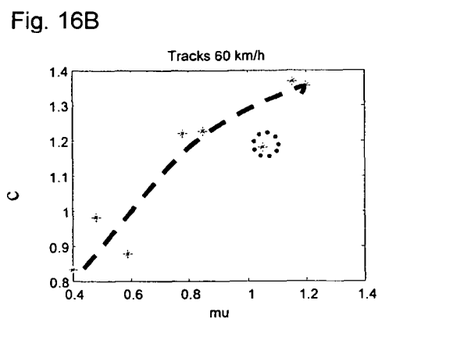
Figure 16C:
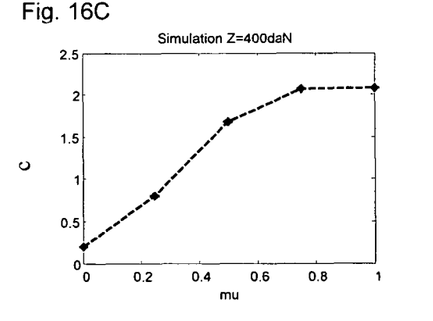
Figure 16D:
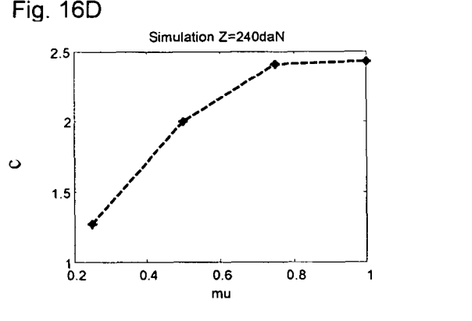
Figure 17A:
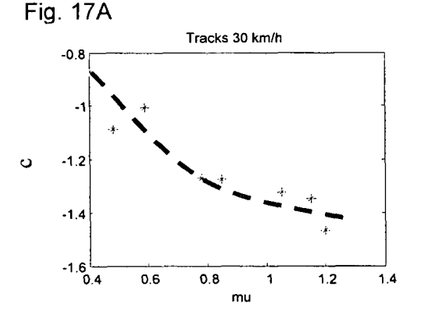
FIGS. 17A to 17D illustrate the correlation between the value of a twelfth criterion called <<max value of the derivative of $\sigma(x)$>> and the value of the maximal grip coefficient $\mu$.
Figure 17B:
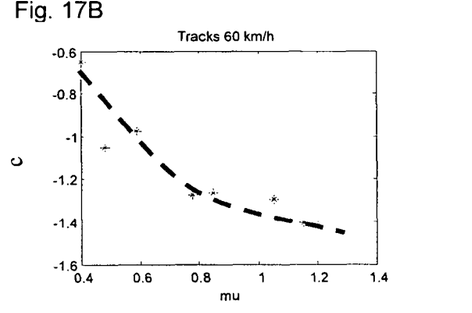
Figure 17C:
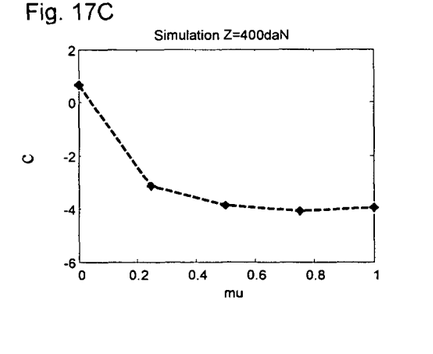
Figure 17D:
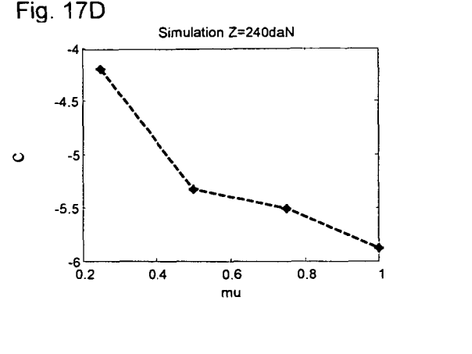
Figure 18A:
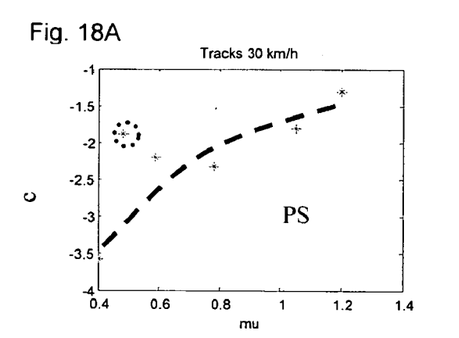
FIGS. 18A to 18D illustrate the correlation between the value of a thirteenth criterion called <<$2^{nd}$ order polynomial of the derivative of $\sigma(x)$>> and the value of the maximal grip coefficient $\mu$.
Figure 18B:
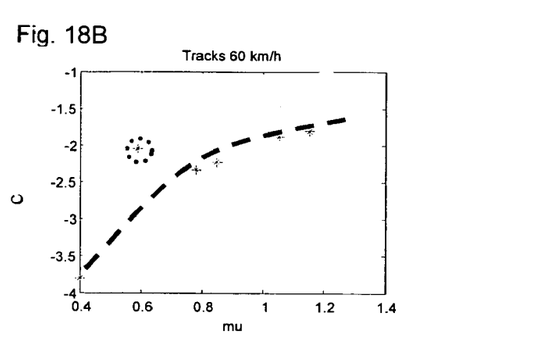
Figure 18C:
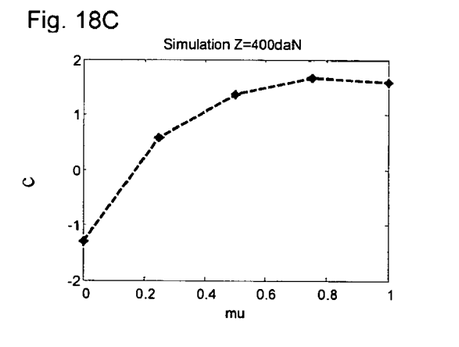
Figure 18D:
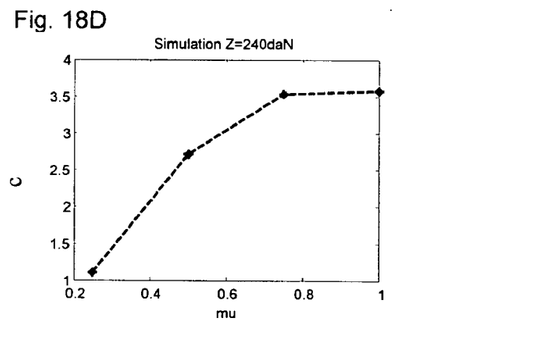

Before going into details concerning the operations carried out in block <<2>> we will anticipate somewhat what follows by illustrating the influence of parameters which should preferably be taken into account. For a Criterion referred to as <<$1^{st}$ order polynomial of $\sigma(x)$>>, FIGS. 4A to 4F respectively illustrate the influence of the parameters: transmitted torque (significant influence, FIG. 4A), drift angle (or force Fy, which would be equivalent—significant influence, FIG. 4B), camber angle of the tire (negligible influence, FIG. 4C), load of the tire (FIG. 4D), pressure of the tire (FIG. 4E, pressure and load in fact are two expressions of the same physical phenomenon, the influence of which is significant), speed of the tire (FIG. 4F, little influence in the speed range tested here).

It should be noted that the measurements corresponding to these FIGS. 4A to 4F were carried out on a test machine referred to as a flat surface roller, on which the rolling surface consists of a steel belt tensioned by two rollers in order to advance horizontally while presenting a flat contact surface for the tire, the load generated by the tire on the steel belt being supported by a pressurised water carpet. This rolling mode generates a local phenomenon of flattening the tread of the casing, which is substantially different from that observed in simulation or on a real surface. This is why the shape of the correlation between our criterion referred to as <<$1^{st}$ order polynomial of $\sigma(x)$>> and the grip in FIGS. 4A to 4F differs slightly from that represented in FIGS. 9A to 9D, even though the "grip" criterion is identical. This difference concerns only the high grip zone and yet does not prevent quantifying the influence of the rolling parameters (load, pressure, etc.) which, for its part, results from the overall mechanics of the tire and is influenced only little by different local flattening.

In order to be able to correlate the measurements to grip, it is useful to have at least certain pieces of information about the current rolling conditions of the tire, unless these conditions can be assumed constant. This would be the case with a measuring trailer such as those used by laboratories, for example, these trailers being fitted with systems for keeping the rolling conditions constant or referencing the rolling phases in which of these conditions are constant.

In applications to moving vehicles, however, it is thus preferable to take into account at least those of the parameters which have a fairly great influence on the correlation between the criteria and the grip. In this scope it is possible to use the same signals delivered by the sensor 10 to which an ad hoc treatment is applied, or alternatively it is possible to use other sensors installed in the tire (for example, see how to obtain Fx, Fy, Fz, P and the camber from stress measurements in the bottom zone by consulting Patent Application WO2003/014687-A1, or from extension measurements in the side wall by consulting Patent Application WO2003/014693-A1) or elsewhere (dynamometric measurements on the wheel, information coming from the drive engine management, ABS sensors, sensors installed in the suspension system).

As concerns the signals S1 to Sn, the information sought about the operating parameters of the tire can be obtained by ad hoc treatments carried out on the signals delivered by the sensor 10, knowing that further to the measurements of $\sigma(x)$, the sensor proposed in the U.S. Pat. No. 6,666,079 cited above gives measurements of $\sigma(y)$—direction parallel to the rotation axis of the tire—and $\sigma(z)$—direction perpendicular to the ground; note that:

A good indicator of the force Fx applied to the centre of the wheel is given by $$c_1 = \int_{CA} \sigma_X \, dx$$

The notation "CA" signifies. <<Contact Area>>. Both for the indicator proposed above and for all the ones which follow, the integration may in fact be carried out in all or part of the contact area.

A good indicator of the force Fy due to the drift, applied to the centre of the wheel, is given by $$c_2 = \int_{CA} \sigma_Y \, dx$$

A good indicator of the load Fz applied to the centre of the wheel is given by $$c_3 = \int_{CA} \sigma_Z \, dx$$

the inflation pressure can be obtained very easily by a specific sensor or obtained on the basis of the load (for which c3 is a good indicator) and the length of the contact area, which is detected easily when inspecting the min/max threshold signals $\sigma_x$ and $\sigma_y$ and the signal $\sigma_z$, when it is greater than a threshold.

the rolling speed is given by ABS sensors or on the basis of the sensor 10, which makes it possible to count the number of wheel revolutions, and knowledge of the perimetric development of the tire and the time taken to make a revolution.

the camber could be provided by a specific sensor or by an ad hoc treatment, or it is also possible to use other sensors installed in the tire (see, for example, how to obtain (see the references to Patent Applications WO2003014687A1 and WO2003014693A1 above)).

Other pieces of information, such as the level of wear of the tire, may further contribute to improving the precision for the estimate of the maximal grip coefficient $\mu$.

Various Criteria used to calculate the said instantaneous value will now be illustrated. All these criteria are illustrated with the aid of FIGS. 5A to 19D from which the correlations (or the lack of correlation for the last ones) can be read, and are applied only to the signal $\sigma_x$. Each graph represents a different condition for obtaining the data:

<<Tracks 30 km/h>> or <<Tracks 60 km/h>> signifies a real test on a test track by means of the tire indicated above which is run at the speed indicated, the load being that indicated above (see description of FIG. 3A), <<Simulation Z=240 daN>> or (<Simulation Z=400 daN>> signifies that it is a result obtained by simulation, the load adopted being that indicated.

FIGS. 5A to 5D illustrate the correlation between the value of a first criterion called <<standard deviation of $\sigma(x)$>> and the value of the maximal grip coefficient $\mu$. The standard deviations are calculated for the values acquired in the contact area, i.e. the zone contained between the two extrema (of the X signal) (minimum then maximum or maximum then minimum, depending on the reference frame):

$$\text{Criterion\_"standard deviation"} = \sqrt{\frac{1}{L_{CA}} \int_{CA} (\sigma_X - \overline{\sigma}_X)^2 \, dx}$$

where $$\overline{\sigma}_X = \frac{1}{L_{CA}} \int_{CA} \sigma_X \, dx$$

As already indicated in respect of the indicators, the notation "CA" signifies <<Contact Area>>. Both for the criterion proposed above and for all the ones which follow, the integration may in fact be carried out in all or part of the contact area. In the system according to the invention, for example, the means for finding in the signal the values corresponding to the sensor passing through the contact area of the tire on the ground comprise detection of the maximum and the minimum of σ(x). Advantageously, the values are taken between the said maximum and the said minimum.

FIGS. 6A to 6D illustrate the correlation between the value of a first criterion called <<energy of σ(x)>> and the value of the maximal grip coefficient μ. The energies in question are calculated in the contract area. An energy corresponds to the sum of the squares of the values, whence:

$$\text{Criterion\_"energy"} = \int_{CA} \sigma_X^2 \, dx$$

FIGS. 7A to 7D illustrate the correlation between the value of a second criterion called <<max value of σ(x)>> and the value of the maximal grip coefficient μ. The following is calculated:

$$\text{Criterion\_"max value"} = \max_{CA}(\sigma_X)$$

FIGS. 8A to 8D illustrate the correlation between the value of a third criterion called <<min value of σ(x)>> and the value of the maximal grip coefficient μ. The following is calculated:

$$\text{Criterion\_"max value"} = \min_{CA}(\sigma_X)$$

FIGS. 9A to 10D illustrate the correlation between the value of a fourth criterion called <<$n^{th}$ order polynomial of σ(x)>> and the value of the maximal grip coefficient μ. The criterion is the weight <<a>> of the highest order term, i.e. the value of the weight <<a>> of an $n^{th}$ order polynomial n σ(x)=a·$x^n$+b·$x^{n-1}$+c·$x^{n-2}$+ . . . +u, fitted over at least a part of the contact area.

A first example of this latter criterion is illustrated in FIGS. 9A to 9D. A straight line is fitted over the second half of the contact area. The highest order term is then considered (Criterion_<<$1^{st}$ order polynomial>>=a), which corresponds to a kind of <<average slope of the signal>>. Instead of taking the $2^{nd}$ half of the contact area, any "continuous" zone of the contact area could be taken. The following is calculated:

σ(x)=a·x+b, fitted over all or part of the contact area.

A second example of this latter criterion is illustrated in FIGS. 10A to 10D, which illustrate the correlation between the value of the criterion (fifth criterion) called <<$2^{nd}$ order polynomial of σ(x)>> and the value of the maximal grip coefficient μ. A $2^{nd}$ order polynomial is fitted over the second half of the contact area. The highest order term is then considered (Criterion_<<$2^{nd}$ order polynomial>>=a), which corresponds to a kind of <<average convexity of the signal>>. Instead of taking the $2^{nd}$ half of the contact area, any "continuous" zone of the contact area could be taken. The following is calculated:

σ(x)=a·$x^2$+b·x+c, fitted over all or part of the contact area.

In the same spirit, FIGS. 11A to 11D illustrate the correlation between the value of a sixth criterion called <<$3^{rd}$ order polynomial of σ(x)>> and the value of the maximal grip coefficient μ. A $3^{rd}$ order polynomial is fitted over the contact area. The highest order term is then considered (Criterion_<<$3^{rd}$ order polynomial>>=a), which corresponds to a kind of <<average cubicity of the signal>>. The following is calculated:

σ(x)=a·$x^3$+b·$x^2$+c·x+d, fitted over all or part of the contact area.

FIGS. 12A to 12D illustrate the correlation between the value of a seventh criterion called <<first harmonic of σ(x)>> and the value of the maximal grip coefficient μ. A Fourier series expansion is performed on the signal σ(x) representing the change in the tangential stresses measured in the longitudinal direction, the values being taken in at least a part of the contact area, the operation of Fourier series expansion being well known to the person skilled in the art, and the amplitude of the first harmonic (coefficient $a_1$) is taken as the criterion, $$\sigma(x) = a_0 + \sum_{i=1}^{\infty} a_i \cdot \sin(2\pi f_i + \varphi_i) \text{ with } f_i = i * \frac{1}{A}$$

(where A is the length of the contact area zone chosen for the calculation).

FIGS. 13A to 13D illustrate the correlation between the value of an eighth criterion called <<second harmonic of σ(x)>> and the value of the maximal grip coefficient μ. A Fourier series expansion is performed on the signal σ(x) representing the change in the tangential stresses measured in the longitudinal direction, the values being taken in at least a part of the contact area, and the amplitude of the second harmonic (coefficient $a_2$) is taken as the criterion, $$\sigma(x) = a_0 + \sum_{i=1}^{\infty} a_i \cdot \sin(2\pi f_i + \varphi_i) \text{ with } f_i = i * \frac{1}{A}$$

(where A is the length of the contact area zone chosen for the calculation).

FIGS. 14A to 14D illustrate the correlation between the value of a ninth criterion called <mean value of the derivative of σ(x)>> and the value of the maximal grip coefficient μ. The average value of the derivative of the X stresses over the contact area is calculated:

Criterion_"average value of the derivative"

$$= \frac{1}{L_{CA}} \int_{CA} \frac{d\sigma_x}{dx} dx$$

FIGS. 15A to 15D illustrate the correlation between the value of a tenth criterion called <<standard deviation of the derivative of σ(x)>> and the value of the maximal grip coefficient μ. The standard deviation is calculated over the contact area:

Criterion_"standard deviation of the derivative"

$$= \sqrt{\frac{1}{L_{CA}} \int_{CA} \left( \frac{d\sigma_x}{dx} - \overline{\frac{d\sigma_x}{dx}} \right)^2 dx}$$

where $$\overline{\frac{d\sigma_x}{dx}} = \frac{1}{L_{CA}} \int_{CA} \frac{d\sigma_x}{dx} dx$$

FIGS. 16A to 16D illustrate the correlation between the value of an eleventh criterion called <<energy of the derivative of σ(x)>> and the value of the maximal grip coefficient μ. The energy is calculated over the contact area:

Criterion_"energy of the derivative"

$$= \int_{CA} \frac{d\sigma_x^2}{dx} dx$$

FIGS. 17A to 17D illustrate the correlation between the value of a twelfth criterion called <<max value of the derivative of σ(x)>> and the value of the maximal grip coefficient μ. Over the zone defined above, the maximal value is calculated (if the convexity is turned upwards) or else the minimum value is calculated (if the convexity is turned downwards):

Criterion_"max value of the derivative"

$$= \max_{CA}\left(\frac{d\sigma_x}{dx}\right) \text{ or } \min_{CA}\left(\frac{d\sigma_x}{dx}\right)$$

Another possible preselected criterion is the value of the weight <<a>> of an nth order polynomial n dσ(x)/dx=a·$x^n$+ b·$x^{n-1}$+c·$x^{n-2}$+ . . . +u, fitted to the values of the derivative dσ(x)/dx of the tangential stresses measured in the longitudinal direction, the values being taken in at least a part of the contact area. For example, FIGS. 18A to 18D illustrate the correlation between the value of a thirteenth criterion called <<$2^{nd}$ order polynomial of the derivative of σ(x)>> and the value of the maximal grip coefficient μ. A $2^{nd}$ order polynomial is fitted over the zone defined above. The highest order term (Criterion_<<$2^{nd}$ order polynomial of the derivative>>=a) is then considered, which corresponds to a kind of <average convexity of the signal>>. The following is calculated:

$$\frac{d\sigma_x}{dx}(x) = a \cdot x^2 + b \cdot x + c$$

fitted over all or part of the contact area.

Figure 19A:
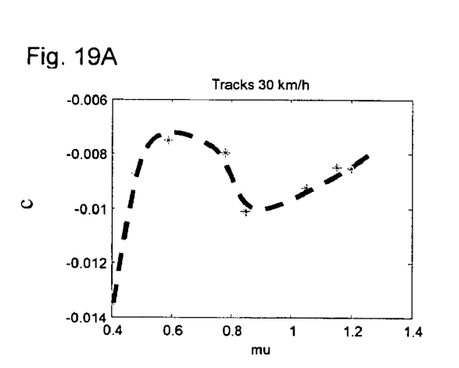
FIGS. 19A and 19D illustrate an unsatisfactory criterion.
Figure 19B:
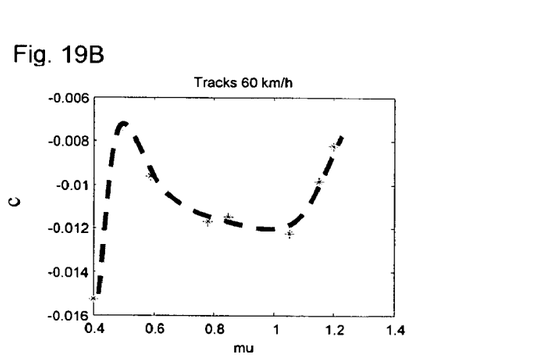
Figure 19C:
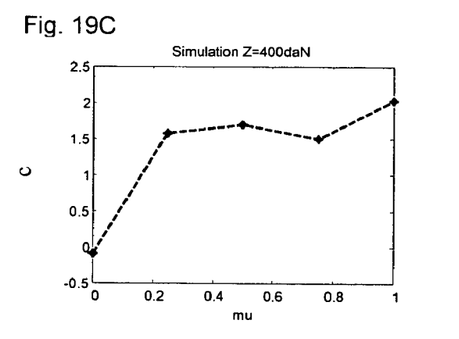
Figure 19D:
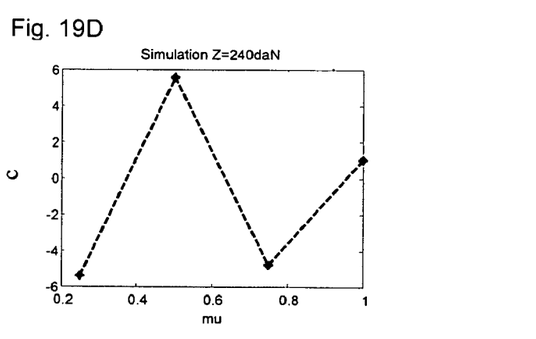

FIGS. 19A and 19D illustrate an unsatisfactory criterion. This is the average value of the signal σ(x), calculated over all the contact area. There are several values of μ for the same value of the criterion, so that discrimination is impossible.

As concerns the block <<3>>, it carries out the step of estimating the maximal grip coefficient μ on the basis of one or several instantaneous values. The means for extracting an estimate of the maximal grip coefficient μ in the system according to the invention advantageously comprise the selection of a predetermined characteristic curve of the change in the maximal grip coefficient μ as a function of the values of the said preselected criterion and the identification on this characteristic curve of an estimate of the maximal grip coefficient μ on the basis of the said instantaneous value. In a particular embodiment, this is respectively the curve illustrating each of the criteria presented above. As a variant, the means for extracting an estimate of the maximal grip coefficient i comprise means for calculating an estimate of the maximal grip coefficient μ on the basis of the said instantaneous value and mathematical equations whose parameters have been fitted.

Figure 20:
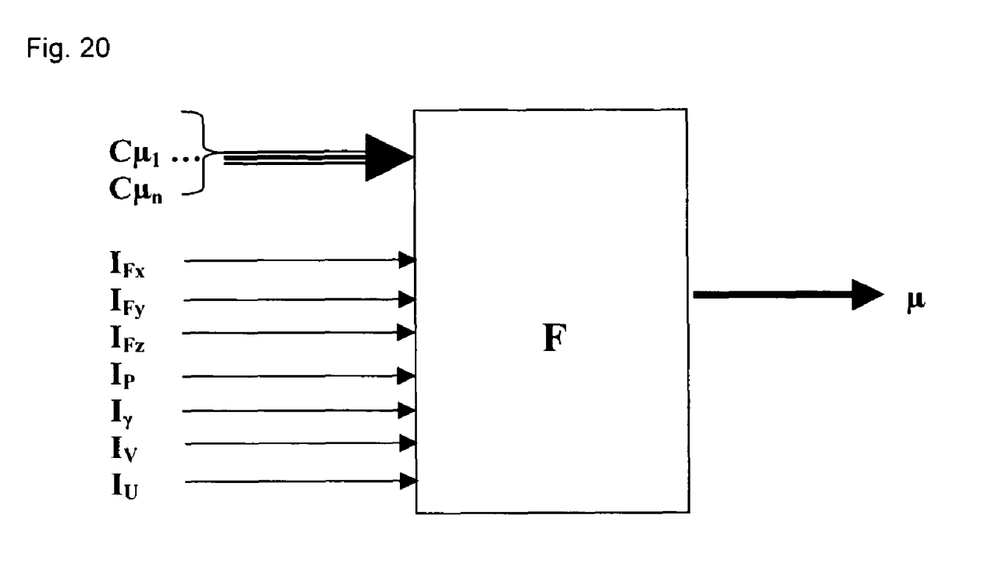
FIG. 20 is a block diagram illustrating a particular embodiment of the invention.

FIG. 20 presents an exemplary embodiment of the block 3. Note that $C\mu_1$, $C\mu_n$ represent one or more criteria containing the grip information, which are chosen for example among those presented above. It has been seen that it is useful (in various degrees) to provide indicators of certain of the operating parameters of the tire such as the load, the pressure of the tire, the camber angle of the tire, the speed of the tire, the transmitted torque and the drift angle or the lateral thrust Fy. $I_{Fx}$ is an indicator for the X force applied to the wheel centre; $I_{Fy}$ is an indicator for the Y force applied to the wheel centre; $I_{Fz}$ is an indicator for the Z force applied to the wheel centre; $I_P$ is an indicator of the inflation pressure of the tire; $I_Y$ is an indicator of camber applied to the wheel centre; $I_V$ is an indicator of the rolling speed; $I_U$ is an indicator of the wear of the tire. Lastly, a unit F comprises a function taking into account all the Indicator parameters or certain of them, as well as one or more Criteria in order to derive the maximal grip coefficient μ therefrom.

This function comprises means for selecting as a function of the chosen indicators a predetermined characteristic curve of change in the maximal grip coefficient μ as a function of the values of the said preselected "grip" criterion, and this function comprises means for deriving an estimate of the maximal grip coefficient μ from the said instantaneous value (see the explanation of each criterion above).

As a variant, this function comprises for example mathematical models (for example: linear, polynomial model or neural network) whose coefficients have been fitted experimentally or theoretically.

The invention claimed is:

1. A system for estimating a maximal grip coefficient μ in the contact area of a tire on a road, comprising:
   at least one tread sensor adapted to be fitted in a tire tread for measuring at least tangential stresses which the tread experiences locally when the tire rolls on the ground, indicators for certain operating parameters of the tire being chosen from a group consisting of a load of the tire, pressure of the tire, a camber angle of the tire and speed of the tire, and a transmitted torque, a drift angle and lateral thrust Y;

a signal processing unit; and means for transmitting to the signal processing unit at least one signal delivered by said at least one tread sensor, wherein the processing unit comprises means for finding in the signal the values corresponding to the at least one tread sensor passing through the contact area of the tire on the ground, means for calculating an instantaneous value of a preselected criterion as a function of a series of values chosen from those relating to the at least one tread sensor passing through the contact area, and means for extracting an estimate of the maximal grip coefficient $\mu$ by using the chosen indicators and the instantaneous value of the preselected criterion.

2. The system according to claim 1, wherein said means for extracting an estimate of the maximal grip coefficient $\mu$ comprise means for selecting as a function of the chosen indicators a predetermined characteristic curve of a change in the maximal grip coefficient $\mu$ as a function of values of the preselected criterion and identification on this characteristic curve of an estimate of the maximal grip coefficient $\mu$ based on the instantaneous value.

3. The system according to claim 2, wherein the means for finding in the signal the values corresponding to the at least one sensor passing through the contact area of the tire on the ground comprise detection of a maximum and a minimum of the values $\sigma(x)$.

4. The system according to claim 3, wherein the values corresponding to the at least one tread sensor are taken between the maximum and the minimum of the values $\sigma(x)$.

5. The system according to claim 1, wherein said means for extracting an estimate of the maximal grip coefficient $\mu$ comprise means for calculating as a function of the chosen indicators and the instantaneous value of the preselected criterion an estimate of the maximal grip coefficient $\mu$ based on the instantaneous value and mathematical equations whose parameters have been fitted.

6. The system according to claim 1, wherein the preselected criterion is a standard deviation of values $\sigma(x)$ of the tangential stresses measured in a longitudinal direction, the values being taken in at least a part of the contact area.

7. The system according to claim 1, wherein the preselected criterion is a sum of squares of values $\sigma(x)$ of the tangential stresses measured in a longitudinal direction, the values being taken in at least a part of the contact area.

8. The system according to claim 1, wherein the preselected criterion is a maximal value of values $\sigma(x)$ of the tangential stresses measured in a longitudinal direction, the values being taken in at least a part of the contact area.

9. The system according to claim 1, wherein the preselected criterion is a minimum value of values $\sigma(x)$ of the tangential stresses measured in a longitudinal direction, the values being taken in at least a part of the contact area.

10. The system according to claim 1, wherein the preselected criterion is a value of a weight <<a>> of an $n^{th}$ order polynomial $\sigma(x)=a \cdot x^n+b \cdot x^{n-1}+c \cdot x^{n-2}+ \ldots +u$, fitted over at least a part of the contact area.

11. The system according to claim 1, wherein the preselected criterion is an amplitude $a_1$ of a first harmonic of a Fourier series expansion of a signal $\sigma(x)$ representing a change in the tangential stresses measured in a longitudinal direction, the values being taken in at least a part of the contact area.

12. The system according to claim 1, wherein the preselected criterion is an amplitude $a_2$ of a second harmonic of a Fourier series expansion of a signal $\sigma(x)$ representing a change in the tangential stresses measured in a longitudinal direction, the values being taken in at least a part of the contact area.

13. The system according to claim 1, wherein the preselected criterion is a mean value of values of a derivative $d\sigma(x)/dx$ of tangential stresses measured in a longitudinal direction, the values being taken in at least a part of the contact area.

14. The system according to claim 1, wherein the preselected criterion is a standard deviation of values of a derivative $d\sigma(x)/dx$ of the tangential stresses measured in a longitudinal direction, the values being taken in at least a part of the contact area.

15. The system according to claim 1, wherein the preselected criterion is a sum of squares of values of a derivative $d\sigma(x)/dx$ of the tangential stresses measured in a longitudinal direction, the values being taken in at least a part of the contact area.

16. The system according to claim 1, wherein the preselected criterion is a maximal value of values of a derivative $d\sigma(x)/dx$ of the tangential stresses measured in a longitudinal direction, the values being taken in at least a part of the contact area.

17. The system according to claim 1, wherein the preselected criterion is a value of a weight <<a>> of an $n^{th}$ order polynomial $d\sigma(x)/dx = a \cdot x^n+b \cdot x^{n-1}+c \cdot x^{n-2}+ \ldots +u$, fitted to values of a derivative $d\sigma(x)/dx$ of the tangential stresses measured in a longitudinal direction, the values being taken in at least a part of the contact area.

* * * * *